US007542313B2

(12) United States Patent
Osaka

(10) Patent No.: US 7,542,313 B2
(45) Date of Patent: Jun. 2, 2009

(54) INDUCTION HEATING APPARATUS CAPABLE OF STABLY OPERATING AT LEAST ONE SWITCHING ELEMENT CONTAINED THEREIN

(75) Inventor: Shohei Osaka, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 238 days.

(21) Appl. No.: 11/546,644

(22) Filed: Oct. 12, 2006

(65) Prior Publication Data

US 2007/0084857 A1 Apr. 19, 2007

(30) Foreign Application Priority Data

Oct. 13, 2005 (JP) ............................ 2005-298524

(51) Int. Cl.
*H02H 7/122* (2006.01)

(52) U.S. Cl. ............................ 363/55; 363/21; 363/97; 219/635; 219/663

(58) Field of Classification Search .................. 363/21, 363/55, 97; 219/635, 661, 663
See application file for complete search history.

(56) References Cited

U.S. PATENT DOCUMENTS

| | | | | |
|---|---|---|---|---|
| 5,229,678 | A * | 7/1993 | Miyazawa | 310/323.08 |
| 5,700,996 | A * | 12/1997 | Lee et al. | 219/626 |
| 6,417,707 | B1 * | 7/2002 | Underhill et al. | 327/165 |
| 6,777,649 | B2 * | 8/2004 | Reynolds et al. | 219/132 |
| 7,009,159 | B2 * | 3/2006 | Kataoka et al. | 219/622 |
| 7,209,370 | B2 * | 4/2007 | Phadke et al. | 363/17 |
| 2004/0131363 | A1 * | 7/2004 | Kisaka et al. | 398/152 |
| 2004/0160509 | A1 * | 8/2004 | Nihei et al. | 347/247 |
| 2005/0121438 | A1 * | 6/2005 | Hirota et al. | 219/663 |
| 2008/0049470 | A1 * | 2/2008 | Ishio et al. | 363/78 |

* cited by examiner

*Primary Examiner*—Akm E Ullah
*Assistant Examiner*—Arun Williams
(74) *Attorney, Agent, or Firm*—Bachman & LaPointe, P.C.

(57) ABSTRACT

An induction heating apparatus capable of stably operating at least one switching element contained therein is provided with a control circuit 5 which comprises a resonance waveform detector 6 for detecting a high frequency AC waveform supplied from an inverter circuit 3 to a heating coil 4 to produce a detection signal $DS_1$ corresponding to high frequency AC power waveform; a phase comparator 8 for producing an adjusting signal PH corresponding to a phase difference between detection signal $DS_1$ from resonance waveform detector 6 and drive signal $D_1$ from drive circuit 7; and an addition circuit 13 for superimposing the drive signal $D_1$ from drive circuit 7 on detection signal $DS_1$ from resonance waveform detector 6 to supply to phase comparator 8the superimposed signal on a level same as or over operation threshold value $V_{TH}$ for the phase comparator 8.

11 Claims, 8 Drawing Sheets

INDUCTION HEATING APPARATUS CAPABLE OF STABLY OPERATING AT LEAST ONE SWITCHING ELEMENT CONTAINED THEREIN

TECHNICAL FIELD

This invention relates to an induction heating apparatus, in particular, of the type capable of stably operating a switching element provided therein even though resonance current flowing through an inverter circuit is lowered in controlling the oscillation frequency in drive signals to the switching element by detecting the resonance current flowing through the inverter circuit in the induction heating apparatus.

BACKGROUND OF THE INVENTION

A know induction heating apparatus shown in FIG. 6, comprises an AC power source 1; a rectifier 2 for commutating AC power from AC power source 1 into DC power; an inverter circuit 3 having two insulated gate bipolar transistors (IGBTs) 11 and 12 as switching elements for converting DC power from rectifier 2 into a high frequency AC power; a heating coil 4 connected to output terminals of inverter circuit 3; and a control circuit 5 for producing drive signals $D_1$, $D_2$ to turn IGBTs 11 and 12 in inverter circuit 3 on and off, and thereby, supplies high frequency AC power to heating coil 4.

AC power source 1 comprises a commercial AC power supply, and rectifier 2 comprises diodes 24 in bridge connection for commutating AC power from AC power source 1, and a capacitor 23 for bypassing or smoothing switched current from diodes 24. IGBTs 11, 12 comprise first and second IGBTs 11 and 12 connected in series between positive and negative terminals of rectifier 2, and reflux diodes 21 and 22 each connected to first and second IGBTs 11 and 12 in the adverse direction. A series circuit of a resonance capacitor 25 and heating coil 4 is connected in parallel to second IGBT 12. Heating coil 4 is driven by high frequency AC power to produce high frequency magnetic flux in magnetic coupling with a heated object made of metal such as iron for induction heating of the heated object.

Control circuit 5 comprises a drive circuit 7 for producing drive signals $D_1$ and $D_2$ to IGBTs 11 and 12, a resonance waveform detector 6 for detecting high frequency AC waveform such as electric current, voltage or power through heating coil 4 to produce detection signals $DS_1$ in response to high frequency AC waveform through heating coil 4, a phase comparator 8 for comparing phases in detection signals $DS_1$ from resonance waveform detector 6 and in drive signals $D_1$ from drive circuit 7 to produce an adjusting signal PH of the level corresponding to the phase difference between detection signals $DS_1$ and drive signals $D_1$, an integrating circuit 57 for converting adjusting signal PH from phase comparator 8 into an averaged DC voltage, and an impedance regulator 40 for producing an impedance corresponding to output level from integrating circuit 57 to vary oscillation frequency in drive signals $D_1$ from drive circuit 7. Not shown but, drive circuit 7 comprises an oscillator which may produce oscillation outputs for driving IGBTs 11 and 12. Otherwise, drive circuit 7 may comprise a driver or drivers for shaping output signals from oscillator into a waveform suitable for driving of IGBTs 11 and 12. Accordingly, drive signals $D_1$ from drive circuit 7 represent output signals from oscillator or drivers. For example, oscillator may comprise a well-known variable frequency (VF) converter, and phase comparator 8 may comprise a well-known digital phase comparator.

Resonance waveform detector 6 comprises a detective transformer 26 for picking out resonance current flowing through heating coil 4 or resonance capacitor 25, a resistor 27 connected in series to detective transformer 26 for converting resonance current picked out by detective transformer 26 into voltage of the level corresponding to resonance current, and a limiter 61 having a resistor 28 and diodes 29 and 30. A junction of resistor 28 and diode 29 provides an output terminal of resonance waveform detector 6 connected to a first input terminal $IN_1$ of phase comparator 8 through a capacitor 38 for removing DC component from output signals of limiter 61 so that resonance waveform detector 6 produces detection signals $DS_1$ to phase comparator 8. In this way, resonance waveform detector 6 detects resonance current of high frequency AC power supplied from inverter circuit 3 to heating coil 4 to produce detection signals $DS_1$ corresponding to high frequency AC waveform. Since inverter circuit 3 furnishes heating coil 4 with high frequency resonance current, detective transformer 26 produces detection signals of widely fluctuating level, however, limiter 61 serves to limit voltage value of detection signal $DS_1$ by resonance waveform detector 6 below a predetermined voltage level. Drive circuit 7 produces drive signals $D_1$ to a second input terminal $IN_2$ of phase comparator 8 through a resistor 47.

Integrating circuit 57 comprises first and second dividing resistors 41 and 42 connected between output terminal of phase comparator 8 and ground, and a capacitor 43 connected between a junction of first and second dividing resistors 41 and 42 and ground. An impedance regulator 40 comprises a field-effect transistor (FET) 44 as a variable impedance element, a resistor 45 connected between source terminal of FET 44 and ground, and third and fourth dividing resistors 37 and 46 connected between an input terminal of drive circuit 7 and ground. FET 44 has a control or gate terminal connected to a junction of first and second dividing resistors 41 and 42 and capacitor 43, and a drain terminal connected to a junction of third and fourth dividing resistors 37 and 46.

Resonance waveform detector 6 delivers detection signals $DS_1$ to a first input terminal $IN_1$ of phase comparator 8, and drive circuit 7 provides drive signals $D_1$ for a second input terminal $IN_2$ of phase comparator 8. As shown in FIG. 7, detection signals $DS_1$ from resonance waveform detector 6 are supplied to first terminal $IN_1$ of phase comparator 8 earlier than drive signals $D_1$ from drive circuit 7, indicating that detection signals $DS_1$ from resonance waveform detector 6 precede in phase drive signals $D_1$ from drive circuit 7. Under the preceding condition in phase of detection signals $DS_1$, at the moment detection signals $DS_1$ of high voltage level from resonance waveform detector 6 reach first input terminal $IN_1$ of phase comparator 8, drive signals $D_1$ of low voltage level from drive circuit 7 come to $IN_2$ of phase comparator 8 which therefore produces an adjusting signal PH of high voltage level shown in FIG. 7(*c*). Then, when phase comparator 8 receives detection signal $DS_1$ of high voltage level from resonance waveform detector 6 and drive signal $D_1$ of high voltage level from drive circuit 7, it produces an adjusting signal PH of intermediate voltage level M. Thereafter, phase comparator 8 maintains to produce adjusting signal PH of intermediate level M, even though either or both of detection signal $DS_1$ from resonance waveform detector 6 and drive signal $D_1$ from drive circuit 7 are shifted to low voltage level.

To the contrary, drive signals $D_1$ from drive circuit 7 reach phase comparator 8 earlier than detection signals $DS_1$ from resonance waveform detector 6 under the preceding condition in phase of drive signals $D_1$, indicating that drive signals $D_1$ from drive circuit 7 precede in phase detection signals $DS_1$ from resonance waveform detector 6. Under the preceding condition in phase of drive signals $D_1$, at the moment drive signals of high voltage level from drive circuit 7 reach second input terminal $IN_2$ of phase comparator 8, detection signals $DS_1$ of low voltage level from resonance waveform detector 6 come to $IN_1$ of phase comparator 8 which therefore produces an adjusting signal PH of low voltage level L shown in FIG. 7(*c*). Subsequently, when both of resonance waveform detector 6 and drive circuit 7 produce detection signals $DS_1$ and drive signals of high voltage level to phase comparator 8, it produces an adjusting signal PH of intermediate voltage level M. Next to this, phase comparator 8 keeps adjusting signal PH of intermediate voltage level M even though either or both of detection signal $DS_1$ from resonance waveform detector 6 and drive signal $D_1$ from drive circuit 7 are shifted to low voltage level.

Specifically, when phase of detection signal $DS_1$ from resonance waveform detector 6 to first input terminal $IN_1$ advances ahead of phase of drive signal $D_1$ from drive circuit 7 to second input terminal $IN_2$, phase comparator 8 produces an adjusting signal PH of high voltage level H in intermediate voltage level M. Otherwise, when phase of detection signal $DS_1$ from resonance waveform detector 6 to first input terminal $IN_1$ lags behind phase of drive signal $D_1$ from drive circuit 7 to second input terminal $IN_2$, phase comparator 8 produces an adjusting signal PH of low voltage level L in intermediate voltage level M. Further, phase comparator 8 continues to produce an adjusting signal PH of intermediate level M when detection signal $DS_1$ from resonance waveform detector 6 and drive signal $D_1$ from drive circuit 7 are simultaneously on the high or low voltage level.

Adjusting signal PH from phase comparator 8 causes electric current to flow through first dividing resistor 41 of integrating circuit 57 into capacitor 43 which serves to average adjusting signals PH from phase comparator 8. Voltage in capacitor 43 of varied level by electrically charging or discharging is applied to gate terminal of FET 44. When high level voltage in capacitor 43 by charging is applied to gate terminal of FET 44, it is turned on to increase electric current through FET 44, thus reducing impedance in impedance regulator 40. Adversely, when low level voltage in capacitor 43 by discharging is applied to gate terminal of FET 44, it diminishes electric current therethrough to increase impedance in impedance regulator 40.

In operation, two drive signals $D_1$ and $D_2$ from drive circuit 7 are alternately applied to each base terminal of a pair of IGBTs 11 and 12 to alternately turn IGBTs 11 and 12 on and off. Drive signals $D_1$ and $D_2$ forwarded from drive circuit 7 do not simultaneously turn IGBTs 11 and 12 on, however, do turn one of IGBTs 11 and 12 on, while turning the other off. Moreover, a dead time is provided for simultaneously turning IGBTs 11 and 12 off after turning one off and before turning the other on. When first IGBT 11 is turned on while second IGBT 12 is kept off, electric current from AC power source 1 through rectifier 2, first IGBT 11, heating coil 4 and resonance capacitor 25 to rectifier 2 to activate heating coil 4 and electrically charge resonance capacitor 25. Adversely, when second IGBT 12 is turned on while first IGBT 11 is kept off, resonance current flows from resonance capacitor 25 through heating coil 4 and IGBT 12 to resonance capacitor 25, electrically discharging resonance capacitor 25. In this way, IGBTs 11 and 12 are alternately turned on and off to perform high frequency induction heating of heating coil 4.

During the operation of heating coil 4, detective transformer 26 detects resonance current passing between heating coil 4 and resonance capacitor 25 to cause limiter 61 to produce detection signal $DS_1$ to first input terminal $IN_1$ of phase comparator 8. Concurrently, drive circuit 7 produces a drive signal $D_1$ to second input terminal $IN_2$ of phase comparator 8 through resistor 47. As mentioned in connection with FIG. 7, when phase of detection signal $DS_1$ moves forward faster than phase of drive signal $D_1$ moves late so that detection signal $DS_1$ is on high voltage level and drive signal $D_1$ is on low voltage level, phase comparator 8 generates an adjusting signal PH of high voltage level H. To the contrary, when phase of drive signal $D_1$ advances faster than phase of detection signal $DS_1$ moves late so that drive signal $D_1$ is on high voltage level, and detection signal $DS_1$ is on low voltage level, phase comparator 8 generates an adjusting signal PH of low voltage level L. When both of drive signal $D_1$ from drive circuit 7 and detection signal $DS_1$ from limiter 61 have high or low voltage level or when one of drive signal $D_1$ and detection signal $DS_1$ has high voltage level and the other has low voltage level, phase comparator 8 generates an adjusting signal PH of intermediate level M.

Integrating circuit 57 averages outputs from phase comparator 8 to provide impedance regulator 40 with the averaged output. Accordingly, with faster phase of detection signal $DS_1$, phase comparator 8 generates adjusting signal PH of high voltage level H to lower impedance of FET 44 in impedance regulator 40. Then, a large amount of electric current flows through FET 44 and resistor 45 to ground to elevate voltage on resistor 37 so that drive circuit 7 reduces the oscillation frequency to diminish drive frequency of IGBTs 11 and 12. To the contrary, with faster phase of drive signal $D_1$, phase comparator 8 generates adjusting signal PH of low voltage level L to increase impedance of FET 44 in impedance regulator 40. Then, a small amount of electric current flows through FET 44 and resistor 45 to ground to reduce voltage on resistor 37 so that drive circuit 7 increases the oscillation frequency to augment drive frequency of IGBTs 11 and 12.

In this way, upper and lower limits of oscillation frequency in drive circuit 7 and oscillation pulses issued from drive circuit 7 are determined dependent on the value of voltage on resistors 37, 45 and 46 in impedance regulator 40. Drive circuit 7 varies oscillation frequency of drive signals $D_1$ and $D_2$ in response to level of adjusting signal PH from phase comparator 8 and produces drive signals $D_1$ and $D_2$ of varied oscillation frequency to IGBTs 11 and 12.

When AC power source 1 produces the output around zero voltage, input power to inverter circuit 3 comes to zero voltage accordingly, and simultaneously, high frequency AC power from inverter circuit 3 to heating coil 4 approaches zero voltage. This causes resonance waveform detector 6 to produce to phase comparator 8 detection signal $DS_1$ of lowered voltage level below operation threshold value $V_{TH}$ for phase comparator 8 which therefore may fail to perform normal operation accompanied by abnormal oscillation in drive circuit 7.

FIG. 8 indicates waveforms of electric current and voltage at selected positions in induction heating apparatus shown in FIG. 6. During the period T of time shown in FIG. 8(*a*), approximately zero voltage of AC power source 1, results in reduction in amplitude of resonance current $I_L$ flowing through heating coil 4, and as shown in FIG. 8(*b*), resonance waveform detector 6 provides first input terminal $IN_1$ of phase comparator 8 with detection signals $DS_1$ of reduced voltage. Accordingly, when resonance waveform detector 6 generates detection signal $DS_1$ of lowered voltage below operation threshold value $V_{TH}$ of phase comparator 8, it cannot produce adjusting signal PH in response to phase difference between detection signal $DS_1$ from resonance waveform detector 6 and drive signal (oscillation pulse) $D_1$ from drive circuit 7.

In this view, Japanese Patent Disclosure No. 6-176862 discloses an induction heating cooker which comprises a self-excitation oscillator for producing oscillation pulses as drive signals to a switching element, a comparative voltage detector for producing detection signals in response to electric power supplied from a rectifying circuit to an inverter circuit, a resonance voltage detector for producing detection signals in response to resonance voltage applied from inverter circuit to a heating coil, and a comparator for producing to self-excitation oscillator output signals in response to differential voltage between detection signals from comparative voltage detector and resonance voltage detector. As induction heating cooker of this reference adds voltage from a circuit power source to detection signal from comparative voltage detector through a waveform shaper, comparative voltage detector produces to comparator detection signals which are not lowered below operation threshold value of comparator even when AC power source produces approximately zero voltage to prevent comparator from producing abnormal trigger pulses to self-excitation oscillator. In this case, comparator does not produce also normal trigger pulses, however, self-excitation oscillator oscillates with the natural frequency to prevent abnormal oscillation of self-excitation oscillator which may produce abnormal drive signals to switching element.

Induction heating cooker of the reference, however, has a defect of performing abnormal operation. Specifically, while a control circuit promptly responds to existence or absence of or alteration in a heated object, self-excitation oscillator oscillates with the natural frequency, and when the natural frequency by self-excitation oscillator is rapidly and increasingly deviated from oscillation frequency by self-excitation oscillator driven by trigger pulses of comparator, drive circuit may disadvantageously supply control terminal of switching element with abnormal drive signals.

Therefore, an object of the present invention is to provide an induction heating apparatus capable of always stably turning a switching element of an inverter circuit on and off even during the period at which electric power produces the output of lowered voltage level. Another object of the present invention is to provide an induction heating apparatus capable of preventing rapid change in oscillation frequency of a drive circuit even when a control circuit promptly responds to change in a load.

SUMMARY OF THE INVENTION

The induction heating apparatus according to the present invention comprises a power source (60); an inverter circuit (3) having at least one switching element (11, 12) for converting power from power source (60) into a high frequency AC power; a heating coil (4) connected to output terminals of inverter circuit (3); and a control circuit (5) having a drive circuit (7) for producing drive signals ($D_1$, $D_2$) to turn switching element (11, 12) on and off and thereby supplying the high frequency AC power to heating coil (4). Control circuit (5) comprises a resonance waveform detector (6) for detecting a high frequency AC waveform supplied from inverter circuit (3) to heating coil (4) to produce a detection signal ($DS_1$) corresponding to high frequency AC power waveform; a phase comparator (8) for producing an adjusting signal (PH) corresponding to a phase difference between detection signal ($DS_1$) from resonance waveform detector (6) and drive signal ($D_1$) from drive circuit (7); and an addition circuit (13) for superimposing the drive signal ($D_1$) from drive circuit (7) on the detection signal ($DS_1$) from resonance waveform detector (6) to supply the superimposed signal to phase comparator (8). Drive circuit (7) determines the oscillation frequency of drive signals ($D_1$, $D_2$) to switching element (11, 12) in response to adjusting signal (PH) from phase comparator (8).

When power source (60) produces the output of low voltage level, resonance waveform detector (6) generates to phase comparator (8) a detection signal ($DS_1$) of lowered voltage level below the operation threshold value ($V_{TH}$) for phase comparator (8). However, addition circuit (13) superimposes the drive signal ($D_1$) from drive circuit (7) on the detection signal ($DS_1$) from resonance waveform detector (6) to prepare the superimposed signal of the level at least a part of which reaches or exceeds the operation threshold value ($V_{TH}$) for phase comparator (8). Specifically, drive signals ($D_1$, $D_2$) are biased, amplified or adjusted to a certain high voltage level in drive circuit (7) and originally generated with a constant frequency before the modulation, and detection signals ($DS_1$) are generated with generally constant phase difference and varied with generally same frequency relative to drive signals ($D_1$, $D_2$). Accordingly, even though power source (60) generates the output of lowered voltage level, at least a part of the superimposed signal of detection signal ($DS_1$) and drive signal ($D_1$) can be maintained on a level same as or over the operation threshold value ($V_{TH}$) for phase comparator (8), while keeping normal operation of phase comparator (8). For that reason, phase comparator (8) supplies drive circuit (7) with a correct adjusting signal (PH) corresponding to phase difference between detection signal ($DS_1$) and drive signal ($D_1$) so that drive circuit (7) provides switching element (11, 12) with drive signals ($D_1$, $D_2$) with the oscillation frequency corresponding to the level of adjusting signal (PH) from phase comparator (8). Consequently, even though control circuit (5) rapidly responds to change in load, the apparatus can prevent rapid change in oscillation frequency of drive circuit (7) to stably and reliably turn switching element (11, 12) in inverter circuit (3) on and off.

The present invention can provide a highly reliable induction heating apparatus that can correctly turn a switching element in inverter circuit on and off.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Figure 6:
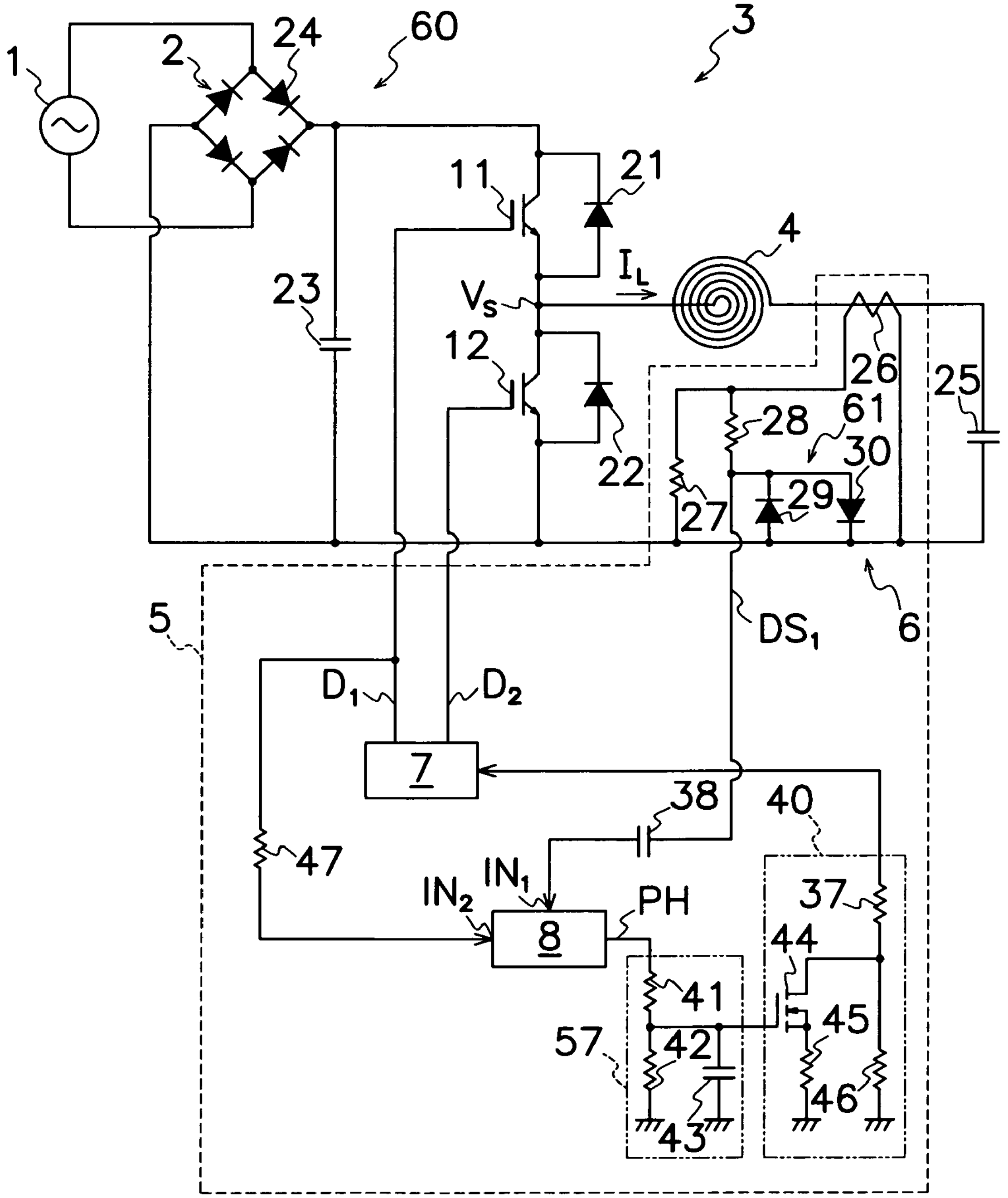
Fig.6 Prior art
FIG. 6 is an electric circuit diagram showing a prior art induction heating apparatus.
Figure 7:
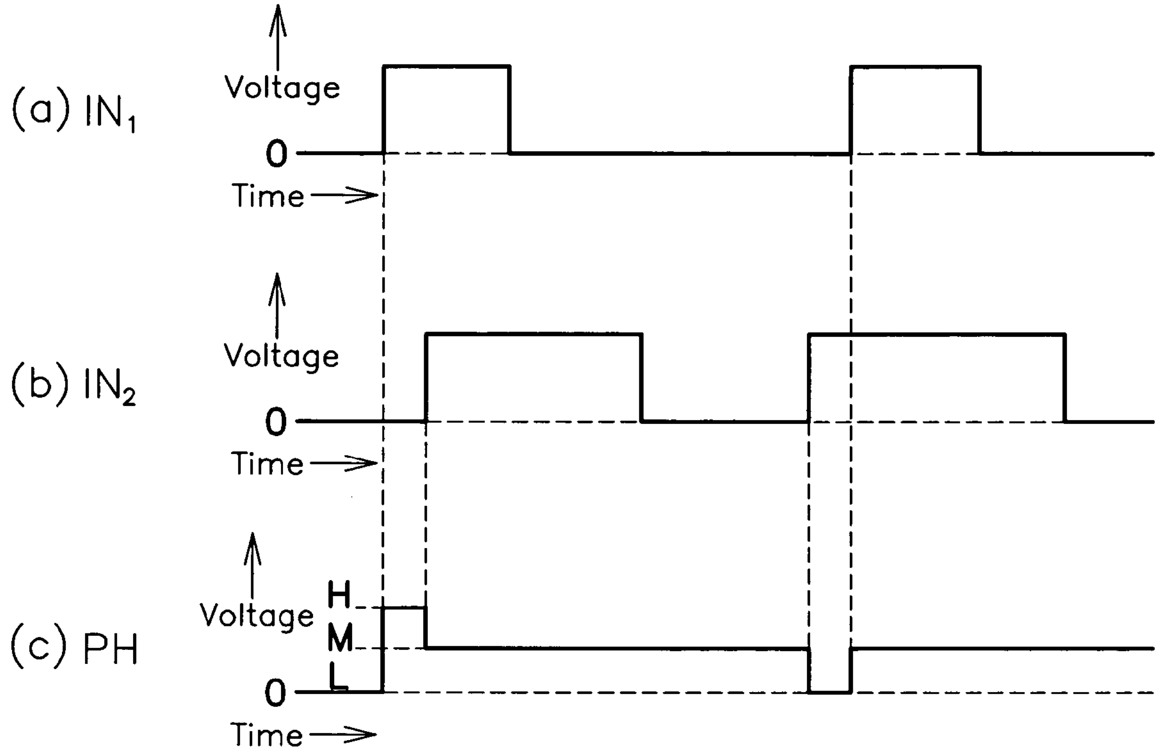
Fig.7 Prior art
FIG. 7 is a graph showing input and output signals of a phase comparator.
Figure 8:
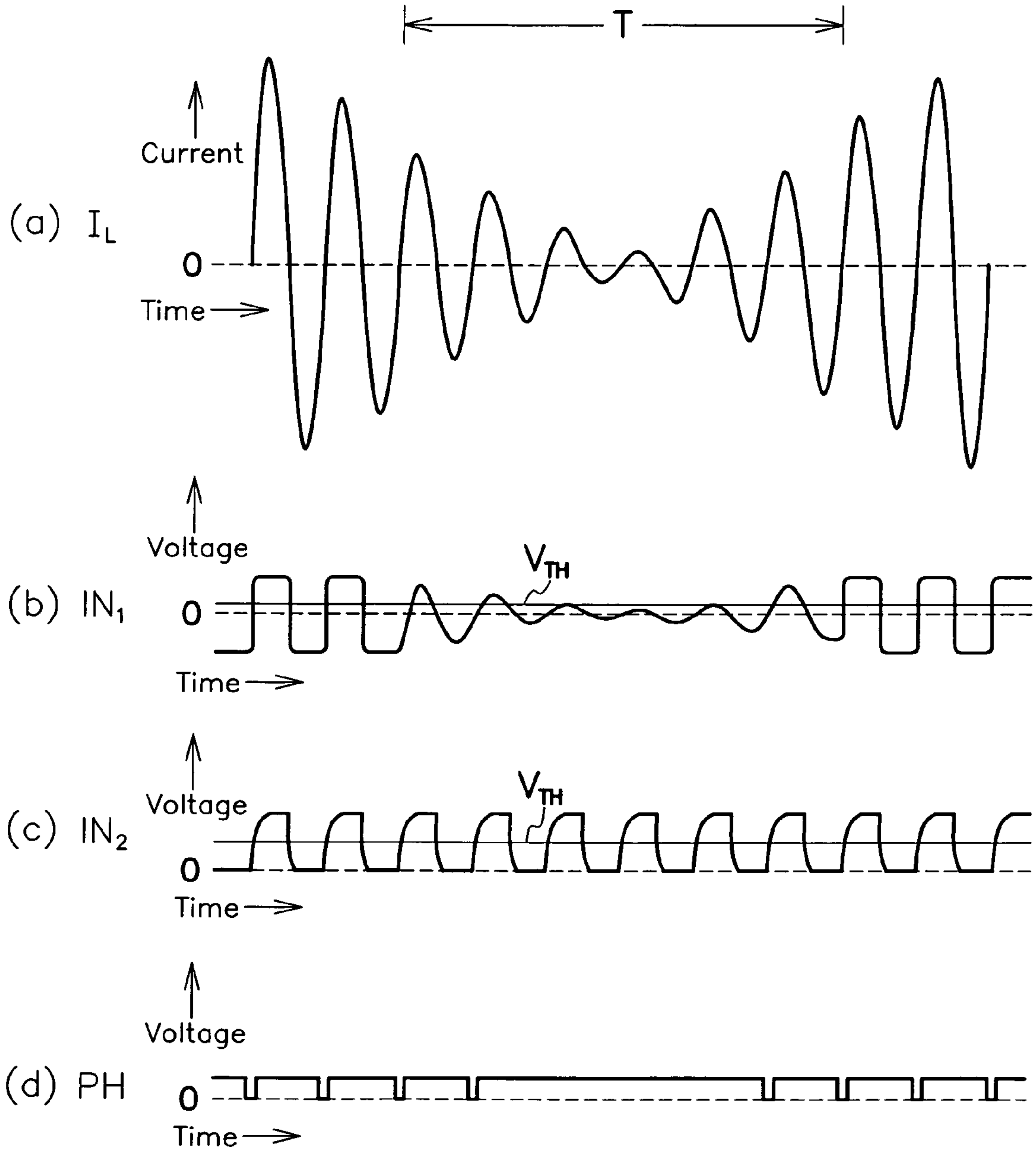
Fig.8 Prior art
FIG. 8 is a graph showing waveforms of electric current and voltage at selected positions in FIG. 6.

Embodiments of the induction heating apparatus according to the present invention will be described hereinafter in connection with FIGS. 1 to 5 of the drawings. Same reference symbols as those shown in FIGS. 6 to 8 are applied to similar portions in these drawings, omitting explanation therefor.

Figure 1:
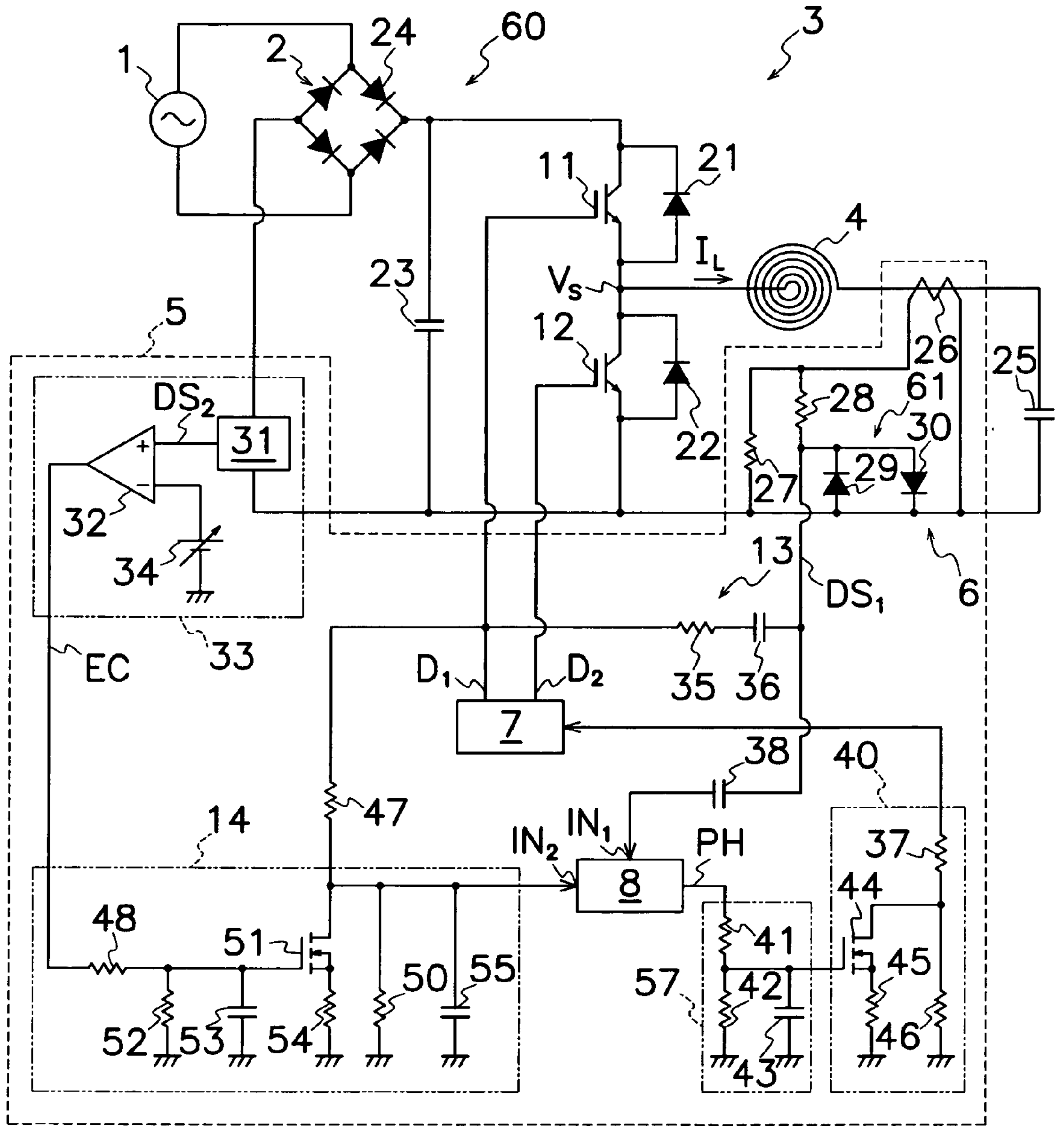
FIG. 1 is an electric circuit diagram showing an embodiment of an induction heating apparatus according to the present invention.
Figure 5:
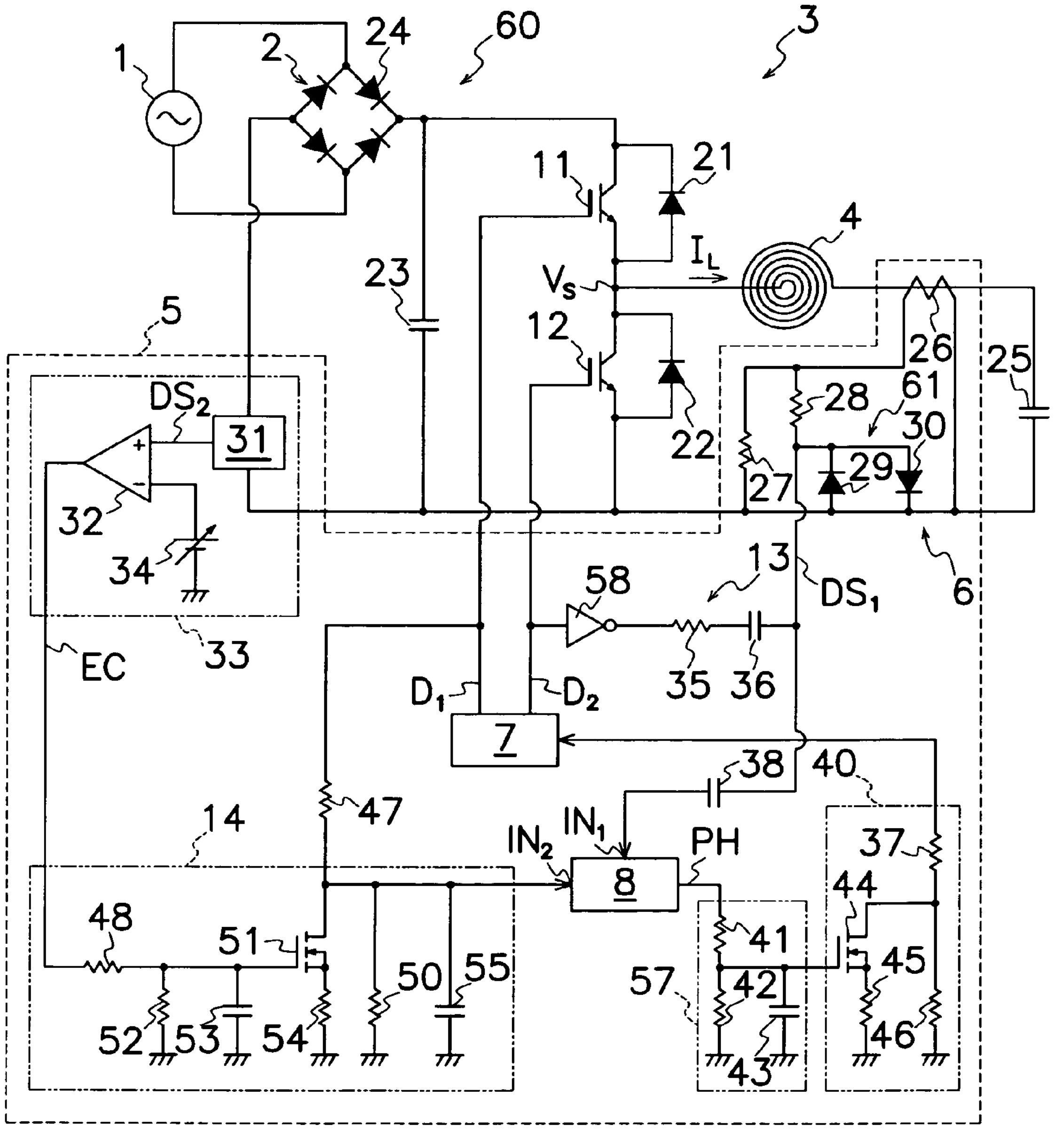
FIG. 5 is an electric circuit diagram showing another embodiment of the induction heating apparatus according to the present invention.

Unlike the prior art induction heating apparatus shown in FIG. 5, the induction heating apparatus of an embodiment shown in FIG. 1, is characterized in that control circuit 5 comprises an addition circuit 13 for superimposing drive signal $D_1$ from drive circuit 7 on detection signal $DS_1$ from resonance waveform detector 6 to supply the superimposed signal to phase comparator 8, a heat controller 33 for producing an output signal EC in response to the amount of electric power supplied from power source 60, and a phase shifter 14 for changing timing of inputting drive signal $D_1$ to phase comparator 8. Power source 60 comprises an AC power supply 1, and a rectifier 2 connected to AC power supply 1 for rectifying and converting AC power supplied from AC power supply 1 into DC power.

Addition circuit 13 is connected between a junction of capacitor 38 and resistor 23 in limiter 61 and one output terminal of drive circuit 7 for producing drive signals $D_1$, and it comprises a resistor 35 and a capacitor 36 connected in series to each other. Accordingly, furnished to first input terminal $IN_1$ of phase comparator 8 are detection signals $DS_1$ from resonance waveform detector 6 through capacitor 38 and also drive signals $D_1$ from drive circuit 7 through capacitors 36 and 38 for removing DC component from drive signals $D_1$. Therefore, DC component-free drive signals $D_1$ from drive circuit 7 and detection signals $DS_1$ from resonance waveform detector 6 are superimposed or joined into a merged current supplied to capacitor 38 so that phase comparator 8 can compare phases with accuracy and high sensitivity.

Figure 2:
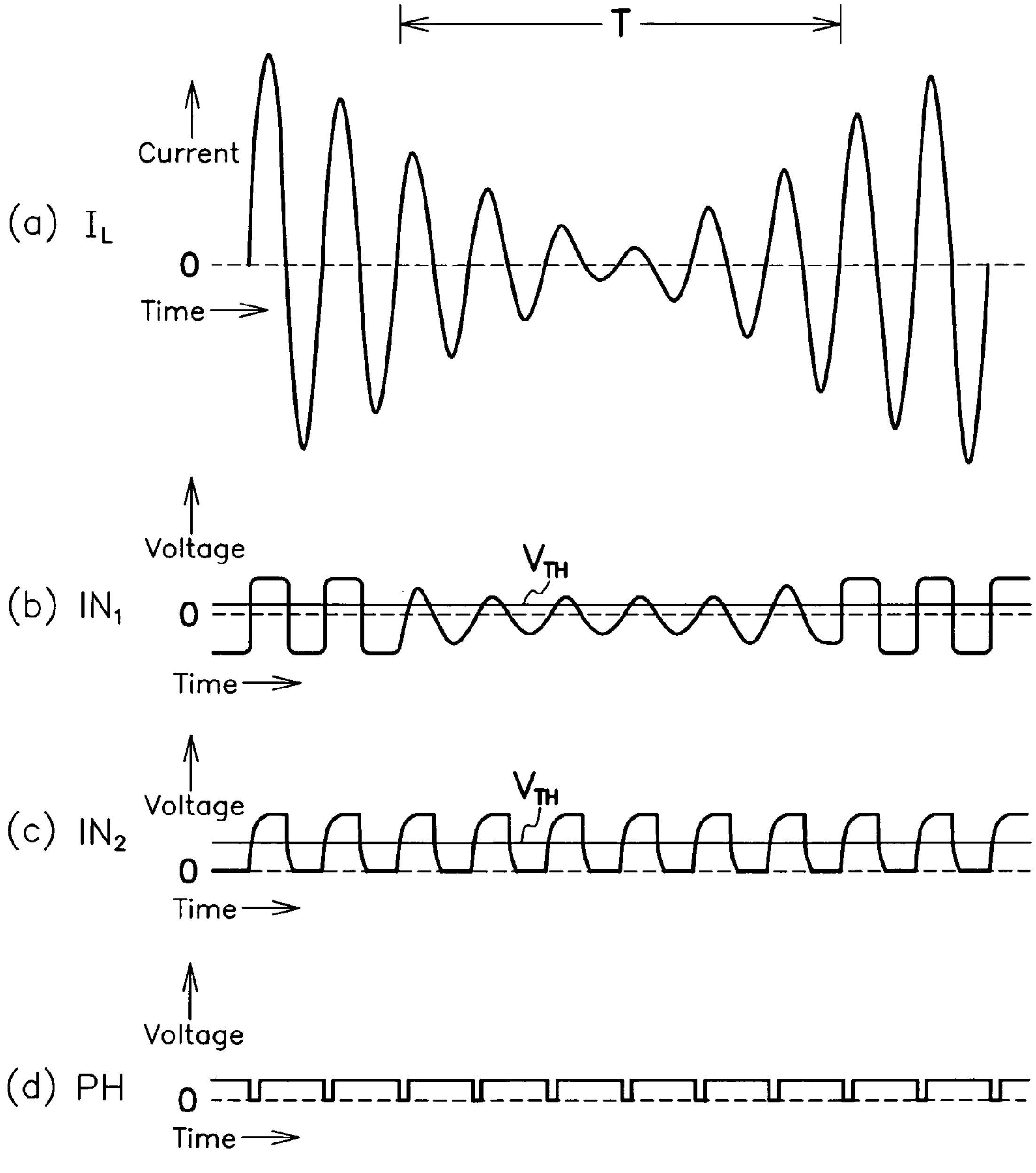
FIG. 2 is a graph showing waveforms of electric current and voltage at selected positions in FIG. 1.

FIG. 2 is a waveform diagram indicating electric current and voltage at selected positions of induction heating apparatus shown in FIG. 1. During the period other than the term T of AC power source 1 producing the output of approximately zero voltage, resonance waveform detector 6 keeps detection voltage of signals $DS_1$ on or above operation threshold value $V_{TH}$ to first input terminal $IN_1$ of phase comparator 8 as shown in FIG. 2(*b*). Unlike this, during the period T wherein AC power source 1 produces outputs of approximately zero voltage, inverter circuit 3 produces resonance current $I_L$ of smaller amplitude to heating coil 4 so that resonance waveform detector 6 produces detection signals $DS_1$ of lower voltage level to first input terminal $IN_1$ of phase comparator 8 as shown in FIG. 2(*b*). Under the circumstances, the induction heating apparatus of this embodiment causes addition circuit 13 to add and superimpose detection signals $DS_1$ from resonance waveform detector 6 on drive signal $D_1$ from drive circuit 7 so that at least a part of the superimposed signal of detection signal $DS_1$ and drive signal $D_1$ can be maintained on a level same as or over the operation threshold value $V_{TH}$ for phase comparator 8, even though resonance waveform detector 6 produces detection signal $DS_1$ of lower voltage level than operation threshold value $V_{TH}$ of phase comparator 8.

In detail, drive circuit 7 originally generates drive signals $D_1$, $D_2$ with a constant frequency, and previously biases, amplifies or adjusts them to a certain high voltage level before the modulation, and detection signals $DS_1$ are generated with generally constant phase difference and varied with generally same frequency relative to drive signals $D_1$ and $D_2$. Accordingly, addition circuit 13 combines detection signals $DS_1$ from resonance waveform detector 6 and drive signals $D_1$ from drive circuit 7 to form the merged signals thereof so that at least a part of merged signals can be retained on a level same as or above operation threshold value $V_{TH}$ for phase comparator 8 although power source 60 produces the output of reduced voltage level. Thus, under the lowered output voltage from power source 60, phase comparator 8 can keep the normal operation to prepare adjusting signals PH corresponding to phase difference between detection signals $DS_1$ from resonance waveform detector 6 and drive signals $D_1$ from drive circuit 7, and forward adjusting signals PH to drive circuit 7 through integrating circuit 57 and impedance regulator 40 so that drive circuit 7 can correctly produce drive signals $D_1$ and $D_2$ responsive to level of adjusting signals PH. Therefore, as shown in FIG. 2(*d*), during the period T, phase comparator 8 assuredly prepares adjusting signals PH in relation to phase difference between detection signals $DS_1$ from resonance waveform detector 6 to first input terminal $IN_1$ and drive signals $D_1$ from drive circuit 7 to second input terminal $IN_2$, and certainly develops adjusting signals PH to drive circuit 7 without lack or deficiency of signals PH. Accordingly, drive circuit 7 oscillates with a given frequency determined by adjusting signals PH from phase comparator 8 to produce drive pulses or signals $D_1$ and $D_2$ oscillated with changed oscillation frequency from outputs.

In other words, addition circuit 13 can serve to always stably turn IGBTs 11 and 12 in inverter circuit 3 on and off, preventing drastic fluctuation in oscillation frequency of drive circuit 7 although control circuit 5 rapidly responds to change in load. Thus, this embodiment can provide a highly reliable induction heating apparatus that can reliably turn IGBTs 11 and 12 in inverter circuit 3 on and off.

As shown in FIG. 1, heat controller 33 comprises an input power detector 31 for producing a detection signal $DS_2$ of voltage level corresponding to amount of electric power supplied from power source 60 and consumed in inverter circuit 3 such as the amount of electric current value or product of electric current and voltage values, a normal power supply 34 for producing a variable reference voltage, and a comparator 32 for comparing detection signal $DS_2$ from input power detector 31 and reference voltage from normal power supply 34 to produce an output signal EC corresponding to potential difference between detection signal $DS_2$ and reference value. Input power detector 31 may comprise for example a current detecting resistor connected in series to rectifier 2 and capacitor 23, and an output terminal of input power detector 31 is connected to a non-inverted input terminal of comparator 32. Normal power supply 34 has a function for a user of induction heating apparatus to optionally adjust desired level of voltage, current and power generated from normal power supply 34 to inverted input terminal of comparator 32. Comparator 32 compares voltage level of detection signal $DS_2$ from input power detector 31 with reference voltage from normal power supply 34 to produce output voltage EC corresponding to an error voltage between voltage levels of detection signal $DS_2$ and reference voltage.

In case of the light load, relatively small amount of electric current flows through inverter circuit 3, and current detecting resistor picks out relatively low voltage in input power detector 31, and in case of the rated load, relatively large amount of electric current flows through inverter circuit 3, and current detecting resistor perceives relatively high voltage in input power detector 31. Accordingly, comparator 32 compares detection signal $DS_2$ from input power detector 31 with reference voltage from normal power supply 34 to produce output signal EC of high and low voltage levels respectively in case of the light and rated loads.

Phase shifter 14 comprises a switch or FET 51 which has one main or drain terminal connected to one output terminal of drive circuit 7 through a resistor 47, a control or gate terminal connected to output terminal of comparator 32 through a resistor 48 and the other main or source terminal connected to ground through a resistor 54; a resistor 52 and a capacitor 53 connected in parallel to each other between resistor 48 and gate terminal of FET 51; and a resistor 50 and a capacitor 55 connected in parallel to each other between source terminal of FET 51 and second input terminal $IN_2$ of phase comparator 8. Phase shifter 14 serves to remove noise from output signals EC from heat control circuit 33 through resistor 52 and capacitor 53, and switch FET 51 to on or off in view of level of output signals EC from heat control circuit 33 to delay timing for supplying drive signals $D_1$ from drive circuit 7 to second input terminal $IN_2$ of phase comparator 8.

Figure 3:
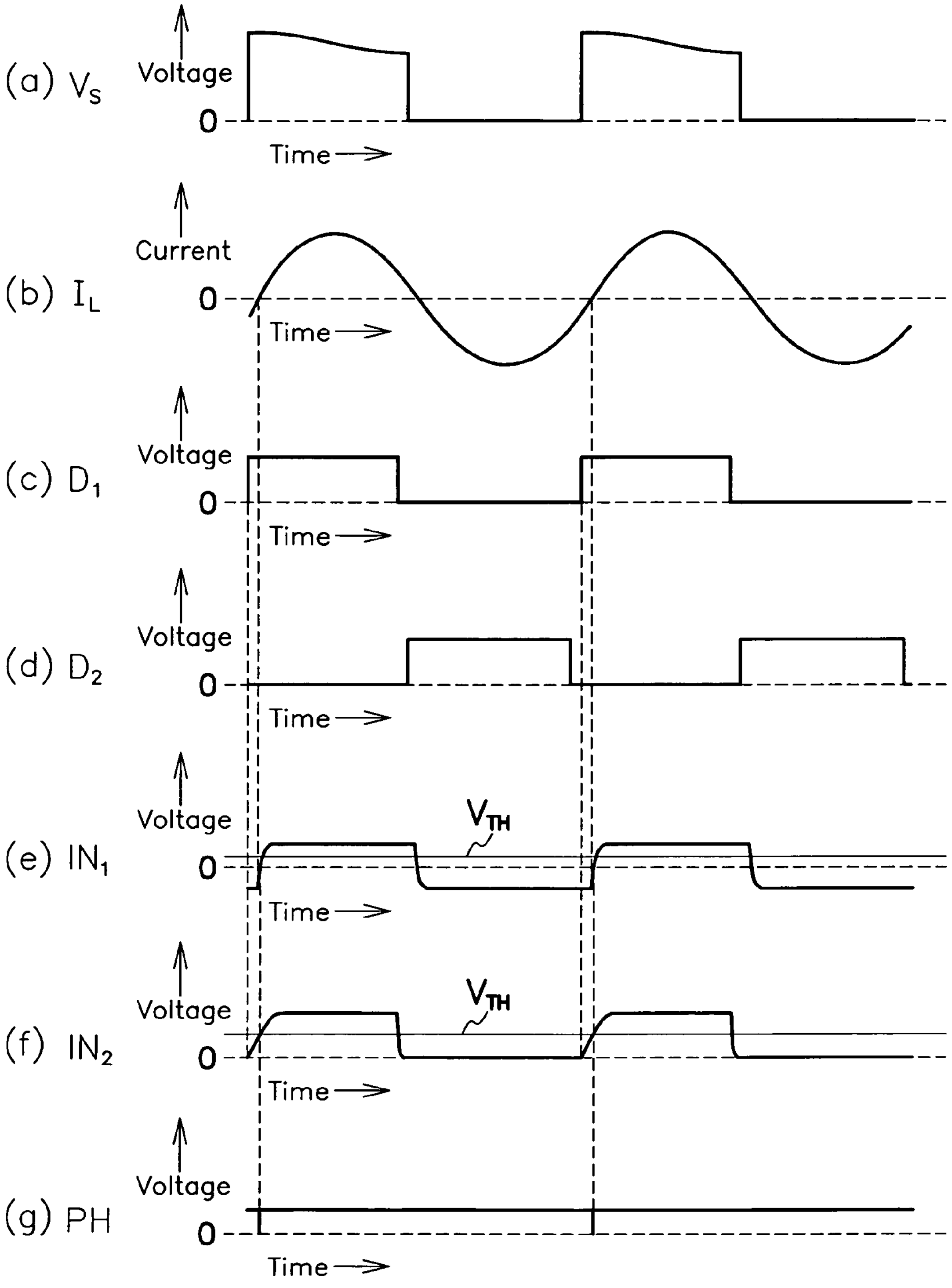
FIG. 3 is a graph showing waveforms of electric current and voltage at selected positions in FIG. 1 under the rated load condition of the apparatus.
Figure 4:
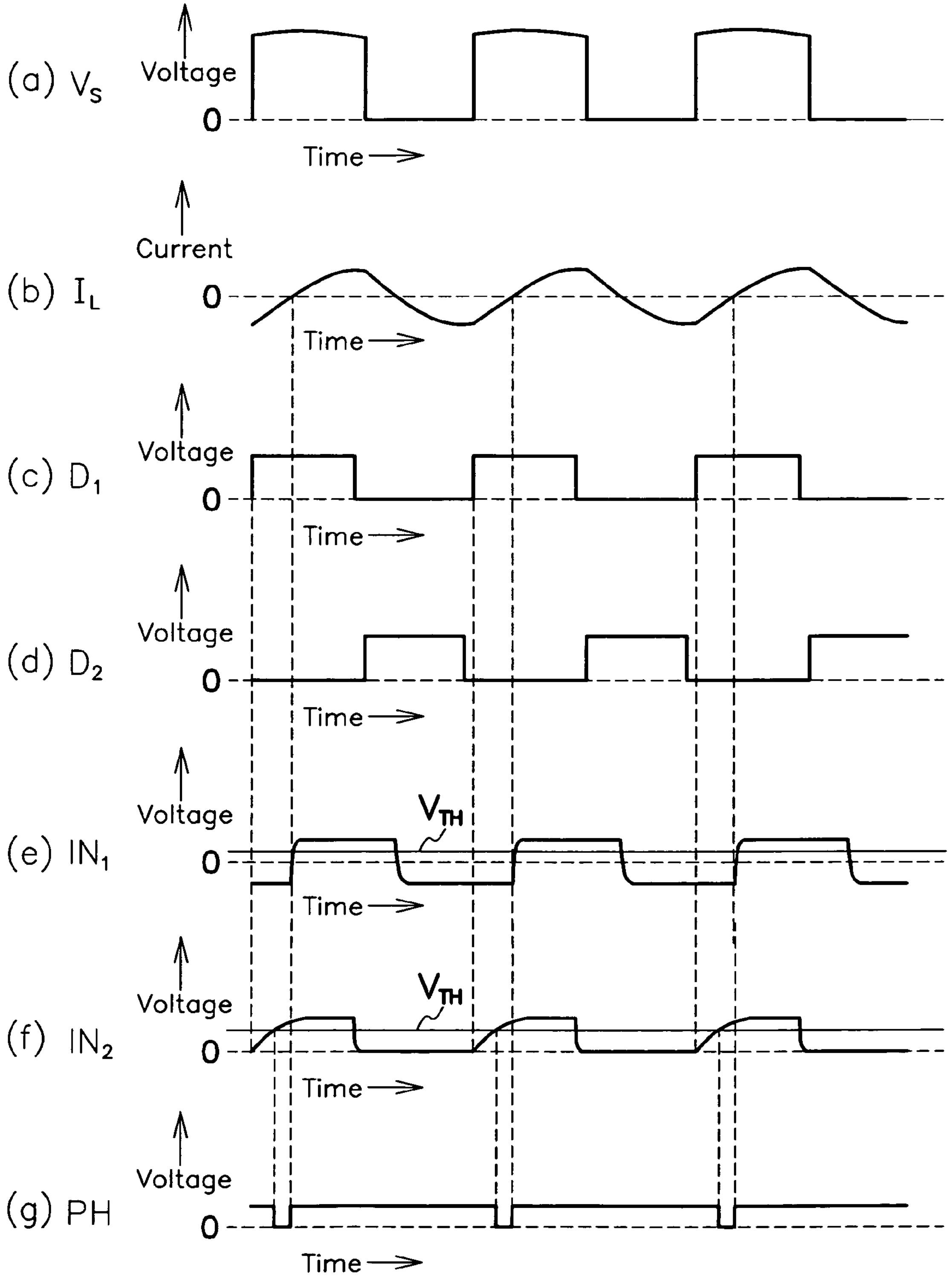
FIG. 4 is a graph showing waveforms of electric current and voltage at selected positions in FIG. 1 under the light load condition of the apparatus.

FIGS. 3 and 4 are graphs indicating electric current and voltage at selected positions of the induction heating apparatus shown in FIG. 1 respectively during the rated and light load periods other than the period T.

As comparator 32 produces output signals EC of low voltage level during the rated load period to turn FET 51 in phase shifter 14 off to accelerate charging rate of electric charge to capacitor 55. Accordingly, as shown in FIG. 3(*f*), drive signals $D_1$ from drive circuit 7 is forwarded to second input terminal $IN_2$ of phase comparator 8 with the slightly late phase. On the other hand, as comparator 32 produces output signals EC of high voltage level during the light load period to turn FET 51 on so that a large amount of electric current flowing through drain and source terminals of FET 51 to ground decreases accumulating rate of electric charge to capacitor 55. Consequently, as shown in FIG. 4(*f*), drive signals $D_1$ from drive circuit 7 is forwarded to second input terminals $IN_2$ of phase comparator 8 with the much later phase than that during the rated load period. Thus, during the rated load period, FET 51 is turned off to deliver drive signals $D_1$ from drive circuit 7 to second input terminal $IN_2$ of phase comparator 8 with the short delay time, whereas during the light load period, FET 51 is turned on to supply drive signals $D_1$ from drive circuit 7 to second input terminal $IN_2$ of phase comparator 8 with the longer delay time.

In other words, phase comparator 8 receives drive signals $D_1$ from drive circuit 7 at second input terminal $IN_2$ with short delay time to produce an adjusting signal PH of long on-pulse width shown in FIG. 3(*g*). FIG. 3(*g*) indicates a time chart in the same condition as that in FIG. 7(*c*), however, FIG. 3(*g*) shows an adjusting signal PH of instantaneous or very short low voltage level or off-pulse width since drive signals $D_1$ from drive circuit 7 reach second input terminal $IN_2$ with almost no delay phase with phase of detection signals $DS_1$ supplied from resonance waveform detector 6 to first input terminal $IN_1$. Specifically, during the rated load period, delay time is shortened of drive signals $D_1$ from drive circuit 7 to second input terminal $IN_2$ relative to detection signals $DS_1$ from resonance waveform detector 6 to first input terminal $IN_1$ to bring oscillation frequency of drive circuit 7 close to resonance frequency of resonance capacitor 25 and heating coil 4. Thus, drive circuit 7 produces drive signals $D_1$ and $D_2$ of oscillation frequency close to resonance frequency of resonance capacitor 25 and heating coil 4 to turn IGBTs 11 and 12 on and off to lower impedance in resonance circuit of resonance capacitor 25 and heating coil 4.

Meanwhile, phase comparator 8 receives at second input terminal $IN_2$ drive signals $D_1$ from drive circuit 7 with longer delay time during the light load period to produce adjusting signals PH of short on-pulse width as shown in FIG. 4(*g*). Since drive signals $D_1$ from drive circuit 7 reach second input terminal $IN_2$ with later phase than that of detection signals $DS_1$ from resonance waveform detector 6 to first input terminal $IN_1$, FIG. 4(*g*) represents adjusting signals PH of longer low voltage level or off-pulse width similarly to FIG. 7(*c*). Thus, delay time is extended of drive signals $D_1$ from drive circuit 7 to second input terminal $IN_2$ relative to detection signals $DS_1$ from resonance waveform detector 6 to first input terminal $IN_1$ during the light load period to settle oscillation frequency of drive circuit 7 on a level sufficiently higher than resonance frequency of resonance capacitor 25 and heating coil 4. Under the circumstances, drive circuit 7 produces drive signals $D_1$ and $D_2$ of oscillation frequency sufficiently higher than resonance frequency of resonance capacitor 25 and heating coil 4 to turn IGBTs 11 and 12 on and off with the oscillation frequency to increase impedance in resonance circuit of resonance capacitor 25 and heating coil 4.

Like prior art induction heating apparatus shown in FIG. 6, adjusting signals PH from phase comparator 8 are averaged through integrating circuit 57. Therefore, during the rated load period, adjusting signals PH of longer on-pulse width from phase comparator 8 cause capacitor 43 to accumulate electric charge to high voltage level to gate terminal of FET 44. Therefore, impedance in FET 44 of impedance regulator 40 is lowered, and a large current passes through FET 44 and resistor 45 to ground to reduce oscillation frequency in drive circuit 7. During the light load period, adjusting signals PH of shorter on-pulse width from phase comparator 8 cause capacitor 43 to charge to low voltage level to gate terminal of FET 44. In this view, impedance in FET 44 of impedance regulator 40 is elevated to increase oscillation frequency in drive circuit 7. Thus, with the increase and decrease in impedance of impedance regulator 40, drive circuit 7 can respectively raise and lower oscillation frequency to adjust and determine oscillation frequency in response to amount of impedance in FET 44 of impedance regulator 40.

During the rated and light load periods, control circuit 5 can supply drive signals $D_1$ from drive circuit 7 to phase comparator 8 with different or varied phase modulated through phase shifter 14 to control on-pulse width of adjusting signals PH from phase comparator 8. Also, heat control circuit 33 serves to control or regulate electric power to heating coil 4 in response to amount of electric power supplied from power source 60.

Embodiments of the present invention may be altered in various ways without limitation to the foregoing embodiments. In the embodiments, control circuit 5 superimposes drive signals $D_1$ from drive circuit 7 on detection signals $DS_1$ from resonance waveform detector 6, otherwise, the other drive signals $D_2$ from drive circuit 7 may be superimposed on detection signals $DS_1$ from resonance waveform detector 6 after inversion of drive signals $D_2$ through an inverter 58. Drive circuit 7 may comprise oscillator and driver not shown and may be formed of control IC for switching power source. Also, oscillator in drive circuit may comprise an analog IC or ICs or a digital IC or ICs for microcomputer.

As shown in FIG. 7, phase comparator 8 produces adjusting signals PH of high voltage level H when detection signals $DS_1$ are supplied to first input terminal $IN_1$ with earlier phase than that of adjusting signals PH to second input terminal $IN_2$, and it produces adjusting signals of low voltage level L when adjusting signals PH are supplied to second input terminal $IN_2$ with earlier phase than that of detection signals $DS_1$ to first input terminal $IN_1$. However, in agreement with operation of drive circuit 7 or if required, high and low voltage levels H and L of adjusting signals PH may be replaced with each other. Phase comparator 8 produces adjusting signals PH of three different high, intermediate and low voltage levels H, M and L, and drive circuit 7 serves to control oscillation frequency of drive signals $D_1$ and $D_2$. Instead, control circuit 5 may employ a phase comparator for producing pulse signals simply indicating the phase, and oscillator oscillated in synchronization with pulse signals from phase comparator.

The present invention is applicable to induction heating apparatus for producing high frequency magnetic flux in heating coil in magnetic coupling with an object such as metallic pots and pans to heat the object.

What is claimed is:

1. An induction heating apparatus comprising a power source; an inverter circuit having at least one switching element for converting power from said power source into a high frequency AC power; a heating coil connected to output terminals of said inverter circuit; and a control circuit having a drive circuit for producing a drive signal to turn said switching element on and off and thereby supplying the high frequency AC power to said heating coil;

wherein said control circuit comprises a resonance waveform detector for detecting a high frequency AC waveform supplied from said inverter to said heating coil to produce a detection signal corresponding to said high frequency AC power waveform; a phase comparator for producing an adjusting signal corresponding to a phase difference between said detection signal from said resonance waveform detector and drive signal from said drive circuit; and an addition circuit for superimposing the drive signal from said drive circuit on the detection signal from said resonance waveform detector to supply the superimposed signal to said phase comparator;

said detection signal from said resonance waveform detector is varied with generally the same frequency relative to the drive signal; and said drive circuit determines the oscillation frequency of drive signal to said switching element in response to said adjusting signal from said phase comparator.

2. The induction heating apparatus of claim 1, wherein said addition circuit removes DC components from said drive signal from drive circuit and superimposes the drive signal on the detection signal from said resonance waveform detector.

3. The induction heating apparatus of clam 1, wherein said control circuit comprises a phase shifter for phase-shifting an input timing of the drive signal from said drive circuit to said phase comparator.

4. The induction heating apparatus of claim 3, wherein said phase shifter defers the phase in the drive signal from said drive circuit to said phase comparator during the light load period later than that during a rated load period.

5. The induction heating apparatus of claim 3 or 4, wherein said control circuit comprises a heat controller for producing an output signal in response to the amount of electric current flowing through said inverter circuit, said phase shifter controls the phase in signals forwarded from said drive circuit to said phase comparator.

6. The induction heating apparatus of claim 5, wherein said heat controller comprises an input power detector for producing a detection signal corresponding to the amount of electric current flowing through said inverter circuit, and a comparator for producing an output signal based on the difference between the detection signal from said input power detector and a reference value.

7. The induction heating apparatus of claim 1, wherein said control circuit comprises an integrating circuit for averaging the adjusting signal from said phase comparator and converting the averaged signal into DC voltage; and an impedance regulator for varying impedance in response to the output level from said integrating circuit to vary the oscillation frequency in drive signals from said drive circuit.

8. The induction heating apparatus of claim 1, wherein said detection signal from said resonance waveform detector are generated with generally constant phase difference relative to the drive signal.

9. The induction heating apparatus of claim 1, wherein said addition circuit comprises a resistor and a capacitor.

10. The induction heating apparatus of claim 1, wherein said addition circuit comprises an inverter, a resistor and a capacitor.

11. The induction heating apparatus of claim 1, said addition circuit prepares a superimposed signal of a level at least a part of which reaches or exceeds an operation threshold value for the phase comparator.

* * * * *